United States Patent
Beloussov et al.

(10) Patent No.: US 7,472,384 B1
(45) Date of Patent: Dec. 30, 2008

(54) SYSTEM, METHOD AND COMPUTER PROGRAM PRODUCT FOR ON-THE-FLY PATCHING OF EXECUTABLE CODE

(75) Inventors: Serguei M Beloussov, Singapore (SG); Stanislav S Protassov, Singapore (SG); Alexander G Tormasov, Moscow (RU); Alexey V Kostyushko, Moscow (RU)

(73) Assignee: SWsoft Holdings, Ltd. (BM)

( * ) Notice: Subject to any disclaimer, the term of this patent is extended or adjusted under 35 U.S.C. 154(b) by 565 days.

(21) Appl. No.: 10/725,016

(22) Filed: Dec. 2, 2003

(51) Int. Cl.
*G06F 9/44* (2006.01)

(52) U.S. Cl. .................... 717/168; 712/233; 719/331

(58) Field of Classification Search .................. 717/168
See application file for complete search history.

(56) References Cited

U.S. PATENT DOCUMENTS

| | | | | |
|---|---|---|---|---|
| 5,581,697 A | * | 12/1996 | Gramlich et al. | 714/35 |
| 5,734,904 A | * | 3/1998 | Kanamori et al. | 719/331 |
| 5,983,337 A | * | 11/1999 | Mahalingaiah et al. | 712/32 |
| 6,112,025 A | * | 8/2000 | Mulchandani et al. | 719/331 |
| 6,305,010 B2 | * | 10/2001 | Agarwal | 717/126 |
| 6,615,329 B2 | * | 9/2003 | Scott et al. | 711/163 |
| 6,721,875 B1 | * | 4/2004 | McCormick et al. | 712/233 |
| 6,915,513 B2 | * | 7/2005 | Duesterwald et al. | 717/168 |
| 6,928,536 B2 | * | 8/2005 | Duesterwald et al. | 712/226 |
| 6,948,164 B2 | * | 9/2005 | Tinker | 717/168 |
| 2003/0101330 A1 | * | 5/2003 | Duesterwald et al. | 712/32 |
| 2004/0049667 A1 | * | 3/2004 | McCormick et al. | 712/233 |

* cited by examiner

Primary Examiner—Wei Y Zhen
Assistant Examiner—Phillip H Nguyen
(74) Attorney, Agent, or Firm—Bardmesser Law Group

(57) ABSTRACT

On-the-fly patching of executable code includes placing a block of modified instructions in memory, identifying a block of code to be patched, storing instructions to be patched from the block of code to be patched in a storage location, change the instructions to be patched to mark instructions, and adding a jump to the block of modified instructions in the block of code. Prior to the placing and the identifying steps, a write flag for a page in memory where the block of code to be patched is located is set to allow writes, and interrupts are masked. The instructions are replaced in reverse order. The mark instructions are the same length, in bytes, as the instructions to be patched. The modified instructions include a resolver to determine a number of instructions of the block of code to be patched that had already been executed.

60 Claims, 6 Drawing Sheets

SYSTEM, METHOD AND COMPUTER PROGRAM PRODUCT FOR ON-THE-FLY PATCHING OF EXECUTABLE CODE

BACKGROUND OF THE INVENTION

1. Field of the Invention

The present invention relates to a method of patching executable code, and more particularly, to a method of hot-swapping, or on-the-fly, patching of executable code during execution.

2. Related Art

The present invention is directed to patching, or changing, of code that is being executed by a processor or processors of a computer. For a number of reasons, it may not be possible or desirable to stop the computer or some running programs in order to reload the updated, or changed, or "patched" code. This may be due to the fact that an application running on the computer is of a critical nature, or due to any number of other factors that make it undesirable to stop the computer in order to change the behavior of the code.

One example of a need for a patch may be a function call by the operating system (OS) that calculates disk quota allocation. If a proprietary OS file system does not support disk quotas and an OS vendor cannot provide that option, a way needs to be found to implement disk quotas as a modification of current OS programs/drivers.

Another example is a change in the code of the operating system itself. The operating system may be one that is running on a server that supports multiple users and multiple applications, such that stopping the applications and the user access to the server in order to reload the OS may be undesirable or unacceptable. Thus, it may be necessary to change the code of the operating system, or some aspect of the operating system, on-the-fly, without stopping the user processes.

Another example of such a patch may be enhancement of security of the operating system that needs to be loaded on the fly. Another example is an upgrade of the operating system to a new version. Yet another example is an upgrade to a driver for a peripheral device, addition of a driver for a new peripheral that was previously not supported by the operating system. Other examples include modifications of critical applications.

The conventional way of patching code is relatively risky. A "direct" method of patching the code involves simply substituting new instructions for the original instructions, without regard to whether or not this particular piece of code is being executed. The outcome can be unpredictable, since, in the case of that instruction being executed, the processor may receive unexpected input or incomplete instructions, potentially resulting in an application crash or a system crash. In a multi-tasking environment, such a crash can occur because a particular process only has CPU resources for a certain time slice, and hands the CPU resources over to another process during the next time slice.

In the context of multi-tasking, in a single processor system, one process runs for a time slice, then that process is suspended, until another process (or several other processes) finish running. At some time slice in the future, the original process resumes execution. Normally, the operating system manages the multi-tasking aspect. Each process, at the time of its suspension, has a set of parameters that include, for example, the address of the code being executed to which the process needs to return upon resumption, the state of certain parameters, registers, stack contents, etc. This is sometimes referred to as the "execution context." The execution context needs to be stored somewhere to enable the process to resume, after suspension.

The address of the instruction to which the process needs to return upon resumption is one of the execution context parameters. If that instruction is in the process of being replaced at the moment that the process returns to that instruction for resumption, the outcome is unpredictable, and may result in program crash. Furthermore, the length of the old instruction (in bytes) and the length of the new (patched) instruction may not be the same. Thus, where the processor, for example, expected a return point to a beginning of an instruction, it is now executing in the middle of patched instruction, further increasing the possibility of a program crash.

The above situation is compounded for a multi-processor system. There, it is even more likely that one processor can make changes to the code while another processor is at the same time executing the same code. Thus, the processor that executes the code suddenly finds itself executing something it did not expect, or something that the writer creator did not intend.

In other words, in a conventional method, there is no guarantee that the substitution (or the patching) of the code will actually be performed correctly, with failure rates as high as 20% or 25%, depending on the operating system and the processor configuration.

A number of conventional methods exist for "safe" installation of patched code:

1. An "external patch" refers to changing the binary code in the executable file. The advantage of this method is that there is no need to implement patching of the code on the fly. The disadvantage is that it may take some time, may require reloading of the code into memory while stopping the processes being run, and may be forbidden by the software licensing agreement.

2. Another method is to simply replace the first byte of any function that is being modified by an interrupt instruction, e.g., a 1-byte instruction INT3 (0xCC) in Intel processors with 32-bit architecture. The advantage of this is that it is the simplest method of patch installation. The disadvantage is that every time the function is called, there is an interrupt. This causes substantial additional overhead.

3. A third method is a "synchronization" method. In this method, all the threads (except the patching thread) are suspended. Upon verification that all of the threads are out of the "danger zone," the first five bytes of the function are modified with a jump to the patching instructions. The advantage of this method is that it avoids the complications of having to install a patch on the fly. The disadvantage of this approach is that it is difficult to ensure the necessary conditions—in other words, that all the threads are actually suspended, rather than merely waiting for user input. Also, suspending all the threads except the patching thread effectively results in a suspension of all useful processor activity, which may be unacceptable for critical applications.

Accordingly, there exists a need for a method of on-the-fly patching of executable code that has predictable results and avoids application program failures or system crashes.

SUMMARY OF THE INVENTION

Accordingly, the present invention is related to a method, system and computer program product for on-the-fly patching of executable code that substantially obviates one or more of the disadvantages of the related art.

In one embodiment, there is provided a method of on-the-fly patching of executable code including placing a block of modified instructions in memory, identifying a block of code to be changed, storing instructions to be changed in a temporary storage location, changing the instructions to be changed to mark instructions, and adding a jump to the block of modified instructions in the block of code to be changed. Prior to the placing and the identifying steps, a write flag for a page in memory where the block of code to be changed is located can be set to allow writes. Prior to the placing and the identifying steps, interrupts can be masked. After the placing and the identifying steps, a write flag for a page in memory where the block of code is located can be restored to disallow writes. After the placing and the identifying steps, interrupts can be unmasked. The instructions may be replaced in reverse order. The mark instructions are the same length or less, in bytes, as the instructions to be changed, with additional of NOP (no operation) filler if necessary.

The additional instructions include a resolver to determine a number of instructions of the block of code to be changed that had already been executed. The resolver determines a number of instructions of the block of code to be changed that had already been executed using the mark instructions. If the number of mark instructions in the block of code to be changed that had already been executed is less than a number of instructions to be changed, then the resolver calls the instructions stored at the storage location so as to imitate a "no patch installed" scenario. After execution of instructions at the storage location, the resolver returns control to a first unchanged instruction in the block of code to be changed. Addressing in the instructions in the storage location is reconciled. If the number of mark instructions in the block of code to be changed that had already been executed is equal to a number of instructions to be changed, then the resolver calls replacement instructions.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

FIG. 1 compares the original code and the patched code with the hook.

DETAILED DESCRIPTION OF THE INVENTION

Reference will now be made in detail to the preferred embodiments of the present invention, examples of which are illustrated in the accompanying drawings.

In the discussion below, the following terminology will be used:

"Code" generally refers to binary or machine code.

"Original code" refers to a portion of the binary code that is typically part of a larger process (e.g., a function is one example of original code), and which needs to be changed.

"Pseudooriginal code" refers to a copy of the portion of the original code that is located at a different address in memory, with the appropriate modifications to ensure that the address references are consistent, without changing the logic of the code itself.

A "hook" refers to code that implements the changed logic. If the hook itself is a filter, then it can also call pseudooriginal code. Usually the hook is added in the process of patching, but it can also be present already, and activated by the patch.

A "stub" refers to internal data and code that calls the hook.

A "patch" refers to a program that changes the contents of a function or a block of code. In one embodiment described herein, a patch is located at the address of the original code and calls a stub to change the logic of the original code.

A "mark instruction" refers to tags, or instructions that leave "countable" marks somewhere, that can then be counted, but without performing any other operations that affect the state of the program.

Figure 1:
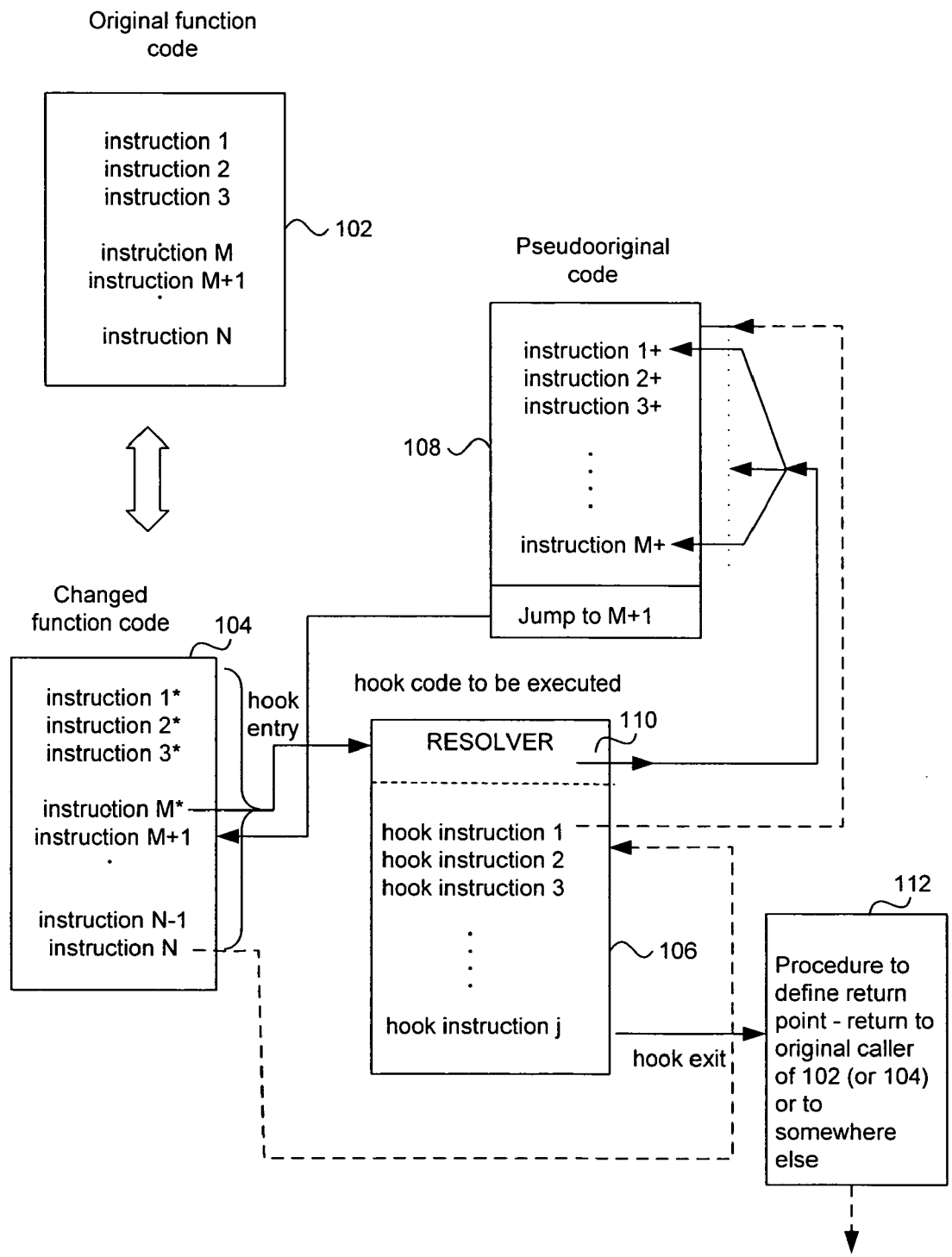

FIG. 1 illustrates the process of code substitution of the present invention. In FIG. 1, 102 designates a particular piece of original code, in this case a function, that needs to be substituted (patched). This function has instructions 1 through N. Normally, the instructions 1 through N of block 102 are stored in memory sequentially, and are executed sequentially. Note that the instructions may have different lengths (in bytes). 104 in FIG. 1 designates the function after the patching process is completed. The changed instructions are designated by the asterisks in 104. Note also that not all the instructions must be changed. In this example, only a subset of the instructions 1 through N are changed (e.g., 1 through M are changed, although it is also possible that every instruction in the function 102 is changed).

Logically, in the memory, there is a portion of code, designated by 106, which represents the "hook," or the changed instructions that need to be executed once the function is patched. These instructions are designated by hook instruction 1 through hook instruction j, in block 106. The hook 106 is thus the code that needs to be executed from the beginning of the patched function 104. Thus, the objective is to "insert" the hook code 106 into the patched function 104, so that the hook code 106 is executed every time the patched function 104 is executed. At the same time, the function address stays the same, and the function input and output parameters stay the same. Only the function behavior is changed. It will be understood that the functions 102, 104 could actually be multiple functions or functions that call other functions.

108 in FIG. 1 is pseudooriginal code, in other words, code of the original function 102 that has been "changed" in the sense of moved to a different location, and changed before the patch actually takes place in order to reconcile addresses, to ensure that operations are updated for receiving current execution address, or to ensure that the instructions are located at a word or doubleword boundary as required by processor architecture, etc. The pseudooriginal code 108 is a list of instructions that have been modified, designated 1+ through M+. In FIG. 1, M is either less than or equal to N. It should be noted that most commonly, the list of instructions in 108 is a contiguous list, without "holes" in it, although a non-contiguous list is also possible.

The pseudooriginal code 108 exists in order to be able to transfer the execution sequence to it (in a manner discussed below), in the event it is necessary to avoid a program crash. Its purpose is therefore to complete those actions that were left incomplete due to the on-going replacement of the instructions in original function 102. Thus, FIG. 1 illustrates two concepts, a patch process and a hook 106. A patch is a program or procedure that changes the contents of a function. The hook 106 is the set of revised (or changed) instructions that are called to be executed instead of the original instructions 1 through M in the original function 102. Upon completion of the hook 106, a procedure 112 may be used to return control to the original caller of the function 104 (or 102) or to transfer it elsewhere.

Figure 2:
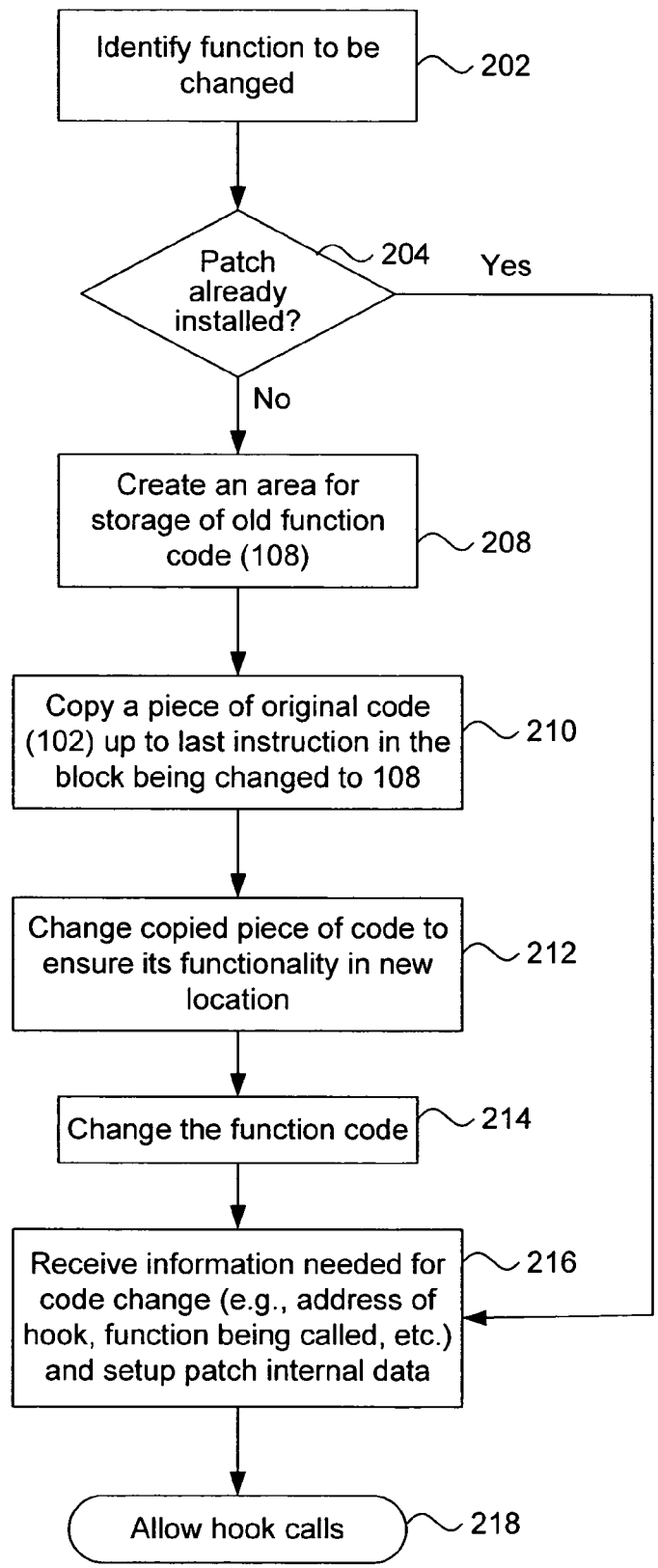
FIGS. 2 and 3 illustrate the process of installing a patch.

With reference to FIG. 2, the process of on-the-fly patching will be explained. First, the function or piece of code that needs to be patched (i.e., 102) is identified (step 202). For step 202, usually each function has some sort of compiler-generated symbolic name, or possibly an address at which it is located. This symbolic name or address is supplied in order to identify the function that needs to be changed. The symbolic name or address is typically generated during the compilation process. In other words, step 202 identifies the block (designated 102 in FIG. 1) that needs to be changed. Step 202 also determines whether this on-the-fly patching procedure can patch the function 102 or whether (for some reason) 102 is an unpatchable portion of code.

If the patch is already installed (step 204), the process then proceeds to step 216 to optionally replace hook data, and then proceeds to step 218 (which allows hook calls). For step 204, if the patch has already been installed, there is no need to reinstall it, and the patch installation routine can return a message to that effect.

If the patch is not yet installed in step 204, an area in storage is created for the old function code (e.g., see block 108 of FIG. 1) (step 208). For step 208, by the patch process or thread, an area where the associated information and instructions are stored needs to be created (e.g., a storage area where the pseudooriginal code 108 is stored).

The original code, up to the last instruction in the block of code being changed (i.e., up to M), is then copied into the storage or memory block 108 (step 210). For step 210, only those instructions that are being patched in the function block 102 (1 through M) need to be copied to the storage area 108. The copied piece is changed to ensure its functionality in the new location (step 212). For step 212, it is necessary to make sure that the addressing of the copied instructions in the pseudooriginal code 108 is consistent. In other words, some instructions use absolute addresses and some use relative addresses. Step 212 ensures that the addressing of the instructions is reconciled with the current location of those instructions. Once the addresses within the instructions in block 108 are reconciled, that code will be able to function at its new location (108). Also, any necessary adjustments are done, depending on processor architecture. Representative adjustments include, for example, alignment adjustment or update of operations for receiving current execution address (e.g., register eip in the Intel X86 architecture), or ensuring that the instructions are located at a word or doubleword boundary as required by processor architecture (i.e., if the processor expects instructions to always start at address 4x, then no instruction in 108 should start at an address that is not divisible by 4). Note that in some cases, the original code in 102 may be relocatable without any further changes. In other words, the block 108 contains functional code that can be executed in the same manner (and with the same functionality) as original instructions 1 through M. At the very end of block 108, a jmp instruction is added to jump to instruction M+1 of the patched code 104.

The function code is then changed (step 214). At the conclusion of step 214, the hook 106 is located in memory at a known address, and a patched portion of code (104) is ready to call the hook 106. Information is then obtained that is necessary for the code change, such as the address of the hook 106, address of the function being called, and various other parameters of the patch (step 216). The process then proceeds to step 218, which allows the hook calls.

Figure 3:
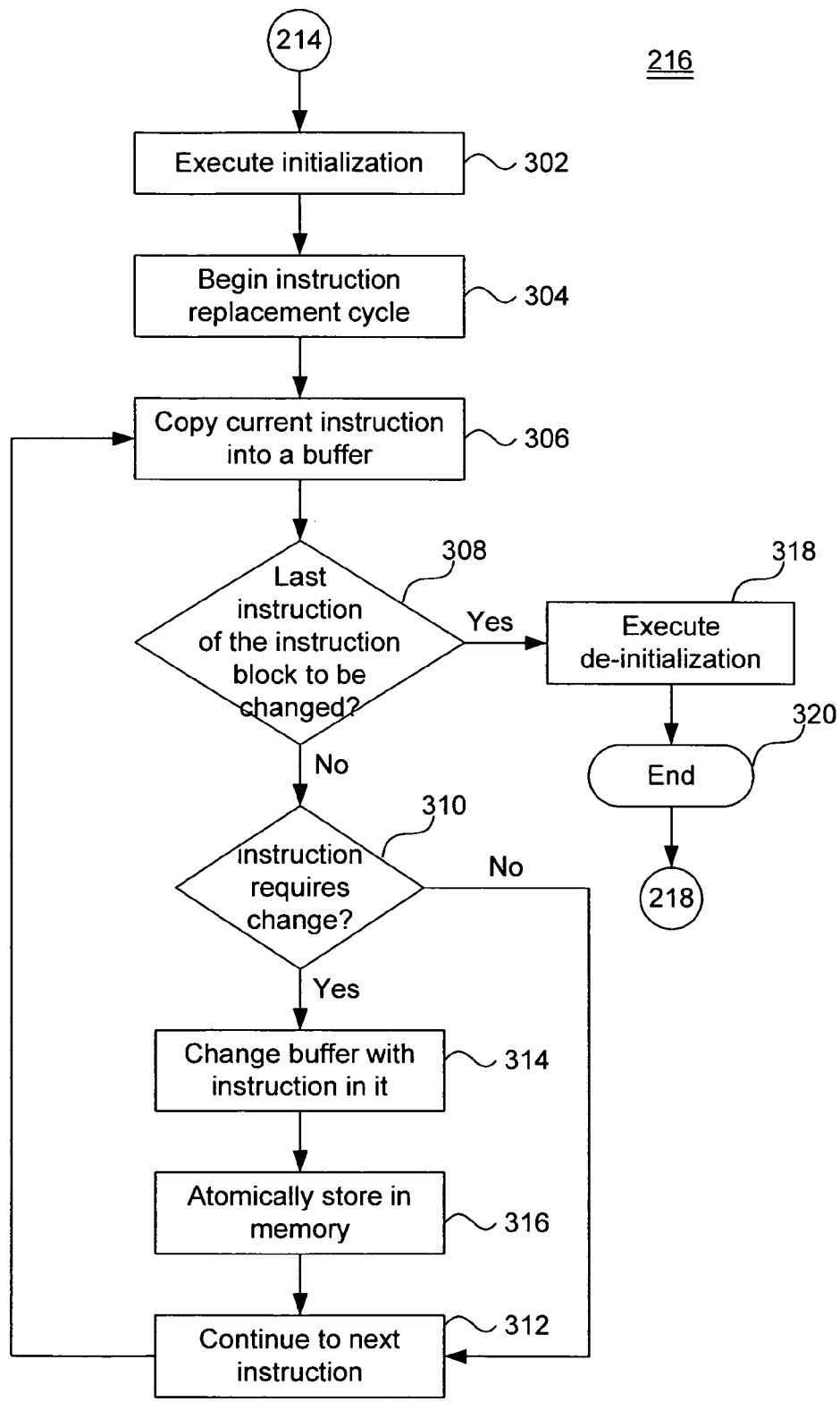

FIG. 3 is a more detailed illustration of step 216 of FIG. 2. As shown in FIG. 3, to allow the code change, an initialization is executed (step 302). For example, in step 302, certain areas (pages) of either virtual memory or real memory may be opened for writing by the patching process. Additionally, external interrupts may need to be masked during the patching process to ensure continuity of the patching process itself. Also, the contents of some registers or the stack may need to be stored in memory or in some other storage and, if this is a virtual memory and this memory was swapped out, a restore and lock is performed on this virtual memory from physical memory to allow operations.

The instruction replacement cycle then begins (step 304). In other words, in step 304, the first instruction that needs to be replaced (patched) is identified. A current instruction is copied into a buffer (step 306). For step 306, the buffer may be a set of CPU registers, a block in memory, or some other kind of storage that can store the instructions temporarily.

If this is the last instruction of the block of instructions that needs to be changed (step 308), de-initialization is executed (step 318), and the patching process ends (step 320). For step 318, the deinitialization process is the reverse of the initialization step 302—in other words, the interrupts are unmasked, the modification flags of memory pages that were being modified are restored, etc.

If it is not the last instruction in the block that needs to be changed, but this instruction itself does not require changing (step 310), the process proceeds to the next instruction (step 312). If the instruction requires a change, the buffer with the instruction is changed (step 314). The instruction is then atomically stored in memory (step 316), and the method then proceeds to the next instruction (step 312). For step 316, the instruction is stored in the same place from which it was originally read. Here, "atomically" refers to the integrity of the block being written into memory. In other words, if the original instruction is a 4-byte instruction, then 4 bytes will be written into memory (and not less than 4). Even if only the first 2 bytes of the 4-byte instruction were changed, the entire 4 bytes will be replaced in the memory, not just 2 bytes. This is sometimes referred to as an "atomic write." Note that although in some processor architectures, an atomic write is done one (whole) instruction at a time, other processor architectures may permit atomic writes in units of multiple whole instructions at a time. The process then returns back to step 306.

Note that in FIG. 3, the order in which the instructions are "processed" (patched) for replacement is not specified. Most commonly, that order is reversed compared to the normal order of execution—in other words, the last instruction in the block that is being modified (i.e., instruction M will be changed first to instruction M*, then the next-to-last instruction will be changed (M-1 changed to (M-1)*), etc. However, a sequence that corresponds to the order of execution sequence is also possible (instead of reverse order), as well as replacement by bigger blocks consisting of a group of instructions in a single atomic write operation.

The atomic write aspect prevents the CPU from being caught in the middle of executing an instruction that is being changed. In other words, either the processor executes an original (unaltered) instruction, or it executes a changed instruction but never anything "in-between." Thus, this procedure is stable with regard to parallel processing or multi-tasking processing. Implementation of the atomic write operation depends on processor architecture. For example, for the Intel X86 architecture it is possible to use instructions like "lock cmpxchg8b," "lock cmpxchg," "lock xchg," or similar types of instructions for this purpose. Note also, with regard to FIG. 3, that when an instruction is changed, its length is never increased. In other words, any replacement command is either the same length as the original instruction (e.g., an 8-byte instruction replaced by an 8-byte instruction) or is shorter (e.g., an 8-byte instruction replaced by a 4-byte one) with corresponding NOP instructions (no operation) "filler" in the remaining bytes. If the instruction to be installed that replaced a patched instruction is longer than maximum possible atomic write operation defined in a particular processor architecture, then a set of subsequent instructions can be used, but this potentially increases a possibility of failure and in general should be avoided.

Figure 4:
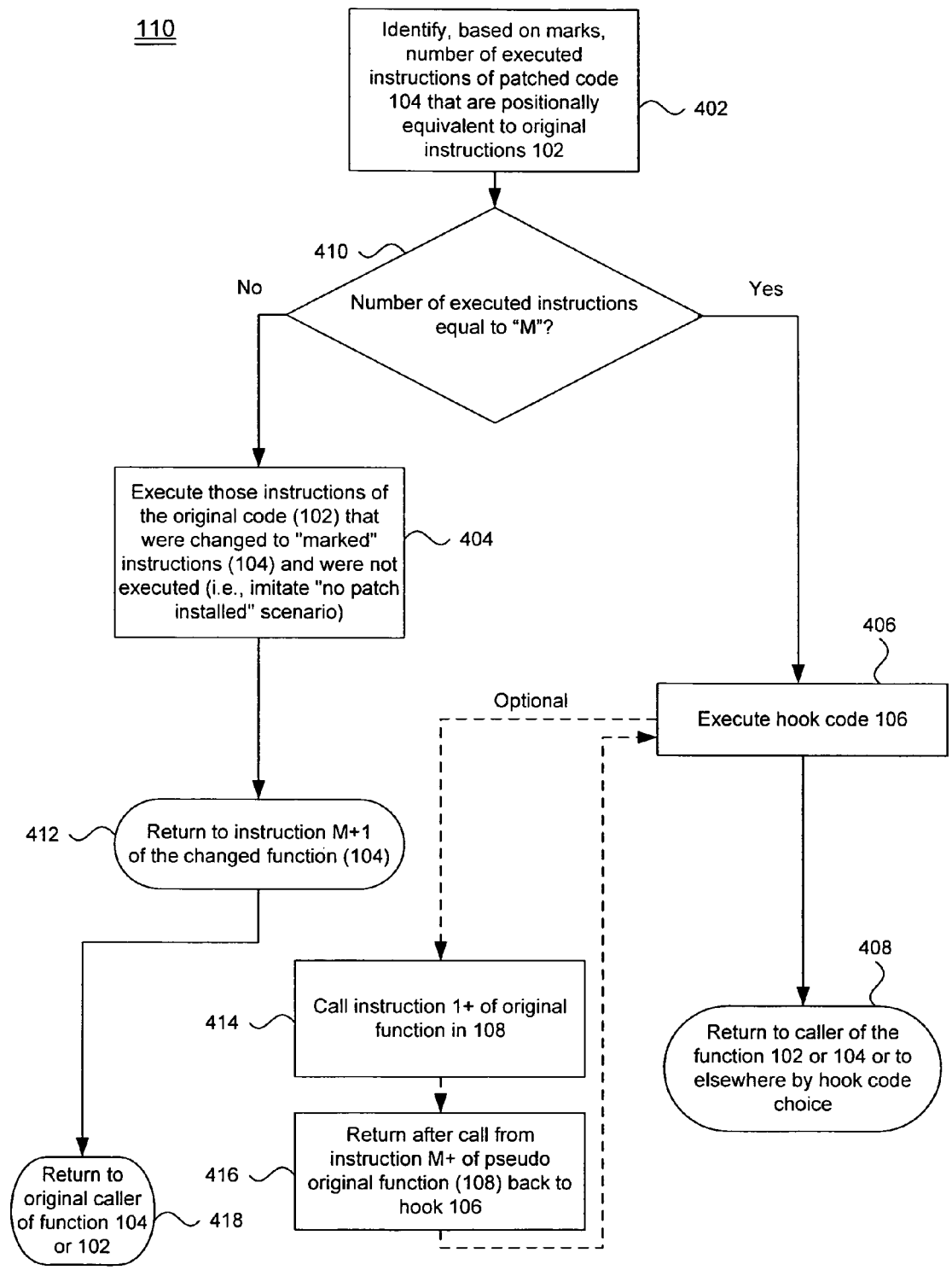
FIG. 4 illustrates the function of a resolver of the hook.

With reference to FIG. 4, the patch process itself is described. In step 402, the patch needs to be aware of the number of executed instructions in the original code 102. This is accomplished with the help of "marks" or mark instructions, described below. This applies both during the time of installation of the hook 106 (in other words, during the patching) and during normal program execution. It is done in order to enable the resolver 110 of the hook 106 (see FIG. 1) to determine how many of the hook's instructions have already been executed. For example, consider the case where there are ten instructions in the function 102. The resolver 110 in the hook 106 determines how many mark instructions have already been executed by checking a current state of a stack. If the number is exactly ten, then means that no original instruction should be executed and the patch will work correctly, and, therefore, the hook can be called. Otherwise the CPU is in the middle of execution of instructions of the original function and should emulate a scenario as if the patch was not called at all. This ensures that the original function 102 will be performed as expected if its execution begins while the patching operation is in progress.

Consider the situation where, in the middle of execution of those ten original commands, the execution was interrupted and then returned to the middle of the process, for example, to instruction seven of the ten original instructions. Thus, upon entering the hook 106, it is possible to determine, by counting results of execution of the "mark" instructions that only seven of the ten instructions had been executed. In that case, the resolver 110 will only execute the three remaining of the ten instructions from the pseudooriginal code 108 and continue normal execution of the function.

In the process of patching, the "mark" instructions preferably replace the original instructions in reverse order.

FIG. 4 illustrates the operation of the resolver 110 of the hook 106. As noted above, the purpose of the resolver 110 is to determine whether the original instructions of the function were executed and whether some of the instructions in the pseudooriginal code 108 should be executed. The execute only "mark" instructions and, therefore, the hook 106 instructions 1 through j should be executed.

As shown in FIG. 4, the first step 402 is to identify, based on marks, the number of executed instructions of the patched code (104) that are positionally equivalent to the instructions in the original function 102. Here, "positionally equivalent" means the patched instructions correspond in relative position to the instructions as the original function 102. The patched and original instructions are, of course, not necessarily functionally equivalent, since the purpose of the patch is inherently to make the function do something other than what it did before. However, as explained above, each instruction in the patch is not longer (in terms of bytes) than the original instruction in the function 102. They may, however, be shorter (in other words, an 8-byte instruction could be replaced by a 2-byte instruction or by a 4-byte instruction, plus NOP instructions "filler"). Such a replacement is usually possible if the "mark" instruction has a length of one byte—minimal length available, for example, in the Intel X86 processor instruction set (note that other architectures can have smaller instructions sizes).

Once the "mark" instructions are identified, the resolver 110 determines whether the number of executed "mark" instructions is equal to M (step 410). Recall that M is the number of instructions that were changed compared to the original function 102 (see block 104 in FIG. 1, where instructions 1* through M* are the changed instructions). If M instructions have been executed already, based on the marks, then the resolver proceeds to step 406, which executes the hook code 106 (in other words, hook instructions 1 through j). After that, the process normally returns to the caller of the original function (i.e., of 104 or 102) or may return elsewhere, depending on the contents of the hook instructions (see step 408). Optionally, the hook code 106 may call the instruction 1+ of the pseudooriginal code 108 (step 414), and return (step 416) after the call from the original instruction N of 104 back to the hook 106. The process returns from original instruction N of 104 because after instruction M* of pseudooriginal code 108, there is a jump command added to jump from code 108 to inside 104, see step 212.

If the number of executed instructions is less than m then, in step 404, those instructions in the original code (102) that were changed to mark instructions (104) will be executed. In other words, a scenario of "no patch installed" will be "imitated" through the use of the pseudooriginal code 108. This occurs in the event that the OS interrupts the patch in the middle of the patching process, and it is not safe to perform the patch with predictable results. After that, the process will return (step 412) to instruction M+1 of the changed function 104, where M+1 is the first non-modified instruction. When the function 104 is completed, the process can return back to the caller of the function 102 or 104 (step 418).

In other words, the code of the hook 106 is executed before the execution of the remaining, unchanged instructions of the original function 102 (assuming that the hook 106 decides to return control back to the function 104 and not transfer control elsewhere).

Figure 5:
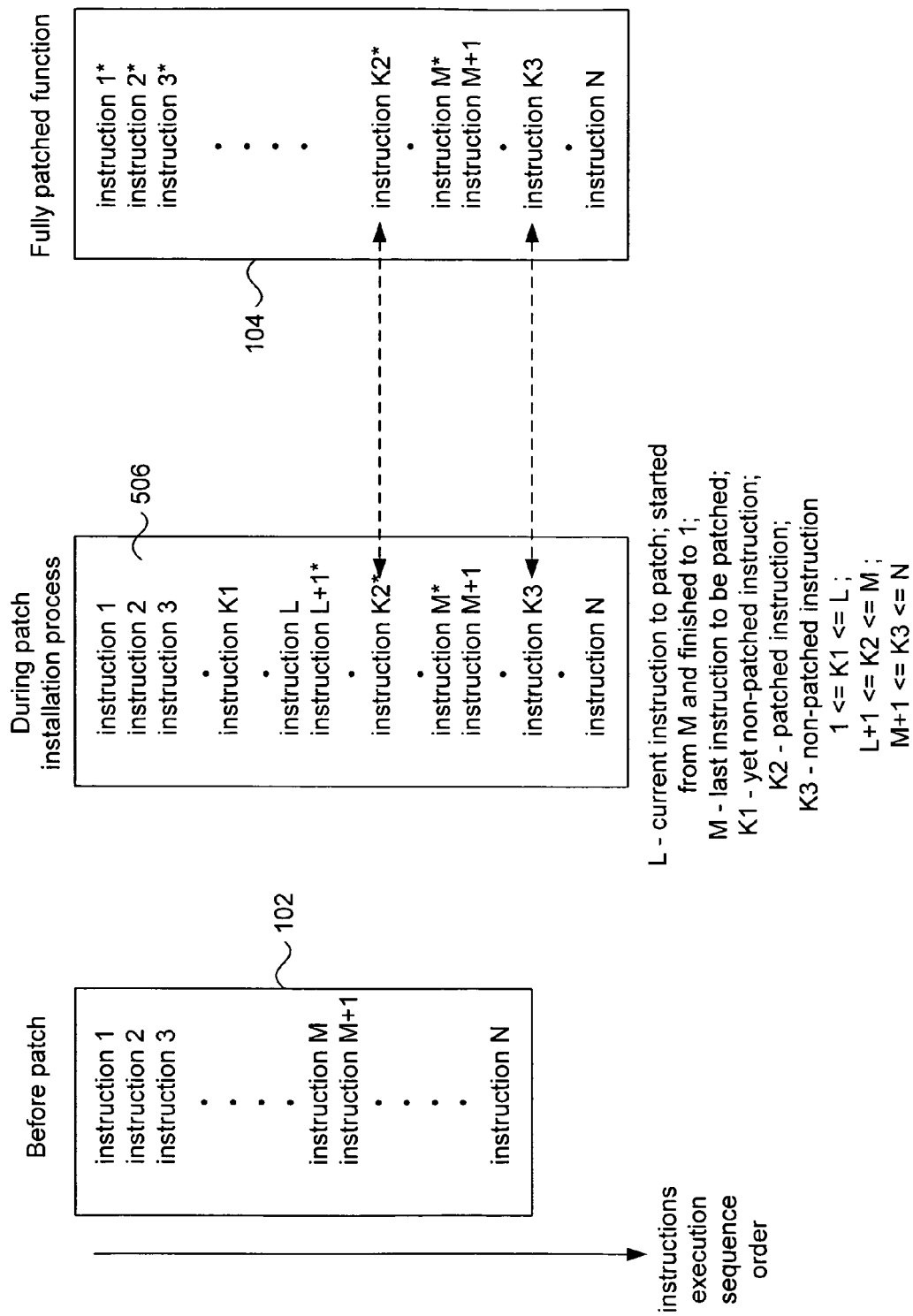
FIG. 5 illustrates the relationship between original code, patched code, and code in the process of being patched.

FIG. 5 illustrates the state of the patch process at various times. As shown in block 102, the original function has instructions 1 through N, of which instructions 1 through M need to be changed, and instructions M+1 through N remain the same. A fully patched function 104, on the right hand side of FIG. 5, has instructions 1* through M* that have been patched, and instructions M+1 through N that remained unaltered. During the patch installation process, in this case, with the patched instructions being installed in reverse order, as seen in block 506, instructions M*, K2* and (L+1)* have been patched. Instructions 1 through L have not been patched, and instructions M+1 through N do not need to be patched. Here, L≧K1, which is ≧1. M≧K2 and K2≧L+1. N≧K3 and K3≧M+1. K1, K2 and K3 are possible instructions to which, during the process of patch installation, execution control can return. If execution returns to instruction K1, the CPU is at the beginning of the patched area and will execute L unpatched instructions, and (L+1)* through M* patched ones. If execution returns to K2, the CPU will execute patched instructions K2* through M* and, most likely, all previous instructions was executed unpatched. In both cases the resolver 110 will understand that the patch has not been successfully completed. Therefore, execution of original instructions will begin, and a situation of "no patch installed" will be initiated by execution of the rest of original instructions from an appropriate place in 108. If execution returns to instruction K3, the patch will also not be executed. This means that even during the process of patch installation, the result is always predictable.

Note that the mark instructions can be instructions that are normally not used during the compilation process. For example, in the Intel X86 architecture, there are two such instructions ("pushad" and "push esp"), which are not normally used by the compiler except in unusual circumstances. This is what is referred to as, "marks," or may be thought of as tags or instructions. The mark instructions leaves "countable" marks somewhere, that can then be counted, but without performing any other operations that affect the state of the program (except, obviously, the program counter change and similar CPU-internal operations). For example, in the Intel X86 architecture, there is a stack, and the pushad and push esp instructions leave marks in the stack, which makes it possible to check and see how many times these mark instructions have been executed. These instructions are also one-byte instructions in the Intel X86 architecture, which makes it convenient to use them as a counter because they can always be installed over any instruction and will never cross a boundary of a current instruction. The resolver 110 can also reverse, if necessary, any effects of the mark instructions.

Note also with reference to FIGS. 1 and 4, that upon returning to the hook 106 from the pseudooriginal code 108, the resolver 110 will always know how many instructions remain to be executed, thanks to the use of the mark instructions. Thus, if the patching process is interrupted, for example, in a multi-tasking environment, or because those instructions are executed during the patching itself, the resolver 110 will always know where the process is at any given time, and if it knows that five out of ten instructions have been executed, meaning that five remain to be executed, it will pick up the execution at instruction number 6\*. Only when the resolver 110 knows that number of executed mark instructions was equal to M (and no instruction of 104 were executed), hook instructions L through j can be executed, if necessary. Otherwise, the hook 106 is not executed at all.

Note also that because of the length restriction (in other words, because the replacement instruction needs to be the same length (or less) as the original instruction) it is generally preferable to find a first instruction to be modified that is a jump instruction. The jump instruction is necessary in order to transfer execution control from original code 102 to the hook 106 via resolver 110. In the Intel X86 architecture, the jump instruction is one of the longest instructions. Therefore, this instruction (or one similar to it in length) can be replaced with the instruction to jump to the hook 106.

Note that the present invention may also be used in virtual private server implementation technology, where the same function can be used in different contexts and by different users without altering its "essential nature." For example, consider a function that normally resides within the operating system kernel, and could only be called by that kernel for handling certain resources. With the on-the-fly patching of the present invention, that function could be modified to only relate to certain classes of resources, where these classes are a subset of the previous set of resources.

With the present invention, even if the patch installation occurs while that particular piece of code is being executed, the result is still guaranteed to be predictable. In other words, the state of execution goes from "working" to "working," and there is no time when the execution of the code is interrupted.

The discussion below is an example of how the present invention is applicable to the Intel X86 architecture. It will be appreciated that the invention is not limited specifically to the Intel X86 architecture, and is equally applicable to many other microprocessor architectures. Also, in the discussion below, it is generally assumed that the reader is sufficiently familiar with the Intel X86 command set, as well as with compilation procedures of high-level languages into assembly language and into machine code. Information on the Intel X86 command set is available from Intel Corp. of Santa Clara, Calif., USA, as well as from various other sources.

First, a conventional "dangerous" method of patching code on the fly will be described. It is assumed that the reader is familiar with the Intel X86 architecture and its instruction set. In this patch, the first five bytes are copied to a stub using the jump/call instruction.

```
Was:
0000: B8 CC EB 04 CC        mov eax,0xCC04EBCC
Becomes:
0000: EB ZZ ZZ ZZ ZZ        jmp stub_code
```

A special case of these five bytes is where the instructions are "one within another", for example, used in the case of copy protection is as follows:

```
0000: B8 CC EB 04 CC        mov eax,0xCC04EBCC
[002]: EB 04                jmp $+6              //to 008:
0005: EB FB                 jmp $-3              //to 002:
0007:
0008:
```

```
Was: (fastcall function return sum of two numbers)
0000: 8B C1                 mov eax,ecx
0002: 03 C2                 add eax,edx
0004: C3                    retn
Becomes:
0000: EB ZZ ZZ ZZ ZZ        jmp stub_code
[0002:] ZZ ZZ ZZ
```

In the last two cases, the following problem exists:

1. An interrupt occurred at the boundary of the instructions within these five bytes. The current thread (thread 1), having processed the interrupt, was paged out by the OS CPU scheduler. After that, one of the next time slices was received by the patching thread (thread 2), which started patching, and copying these five bytes. When the scheduler again allocates a time slice to thread 1, the CPU will start executing code which is in the middle of the jump instruction. In other words, the result is unpredictable and is a classic case of "garbage in, garbage out."

2. In a multi-processor machine, processor A executed the first instruction within the boundaries of the five-byte function. Processor B, having performed the patch, changed these five bytes to the instruction "jmp". Processor A, finding itself in the middle of this jmp instruction, starts executing garbage.

3. Other cases are possible. For example, when waiting for a thread of some object after the patch, the code is in the middle of the jmp instruction that points to a boundary between the instructions that was located there prior to the patch.

The Intel X86 architecture has two 1-byte commands called push esp (0x54) and pushad (0x60), which have the advantage in that they retain in the stack the value of the stack pointer. This fact can be used as a mark, because each execution of this instruction will put a predictable set of data into the stack, which can be identified later with some finite probability. After the push esp instruction, the stack, at address esp, has the value esp+4. After the pushad instruction, the stack, at the addresses esp-esp+0x20, has the values of all the registers. For example, at the address esp+0x0C, is the value at esp 0x20. In the case of the push esp instruction, the identification procedure's error probability is $2^{-32}$ (extremely precise), and in the case of the pushad command, the error probability is $2^{-256}$ (in other words, absolutely precise). These probability values are calculated on the assumption that there is uniform distribution of possible data in the stack. In real life, if the code was generated by a compiler, execution of control transfers to the function 104 will be preceeded by a "call" instruction in a caller function, which modifies stack content in a predictable manner, and which can be definitively distinguished from actions by the mark instructions. Therefore, in such a (most common) case, the probability of mark detection error is essentially zero.

Note that the present discussion does not apply to the case of one instruction within another instruction, primarily because modern compilers do not use this approach. However, it should be noted that the present approach can be expanded to include this case. Another situation involves the case where the executable code itself checks the content of the original code for non-alteration (i.e., copy-protect). Thus, for purposes of the present discussion, it is assumed that these two situations are either not present or are addressed externally. Also, at the beginning of the original code, the register esp points to the stack. The stack is not used above the value esp. Note that the checks that this code performs upon every installation of the hook are as follows:

(1) In the original code, there is at least one instruction that is longer than five bytes. This will be the end of the portion of code being changed.

(2) Also, if terminal instructions are present in the code sequence before the return from function instruction, the function cannot be properly patched by this method. Usually terminal instructions are instructions that cannot be patched or analyzed correctly, such as copy protect instructions or text string (i.e., trying to execute those instructions will result in "garbage in garbage out"). Also, pushad, push esp or retn type instructions (for Intel X36 or equivalent instructions for other processor architectures) should not be found in the portion of the codes being changed.

The hook 106 is installed from the end of the portion of code being changed (102), in reverse order, using atomic write of the type compare-and-exchange. Thus, at any point in time, starting with the first write, the hook works.

The overhead associated with the approach described above is relatively low. It will take several (typically up to ten) pushad commands in the Intel X86 architecture, two jmp commands, and identification of the pushads in the handler. This is a relatively minor slow-down in the speed of function execution, where a hook has been added. It is also much less than the processing of an interrupt, and usually much less than the execution time of the function itself, typically a few percent in most cases.

Figure 6:
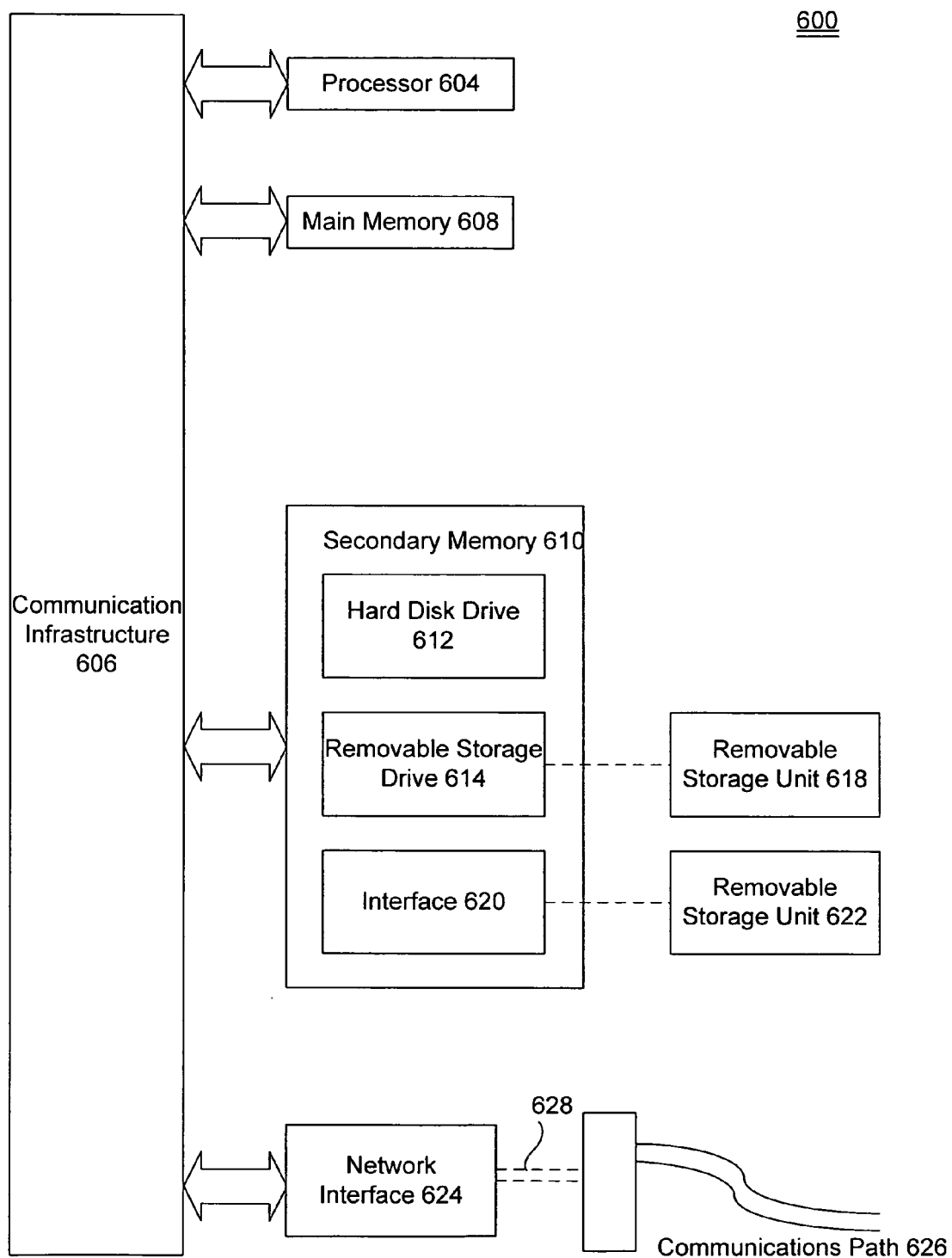
FIG. 6 illustrates an example of a computer architecture that may be used in the present invention.

An example of a computer system 600 where the present invention may be used is illustrated in FIG. 6. The computer system 600 includes one or more processors, such as processor 604. The processor 604 is connected to a communication infrastructure 606, such as a bus or network). Various software implementations are described in terms of this exemplary computer system. After reading this description, it will become apparent to a person skilled in the relevant art how to implement the invention using other computer systems and/or computer architectures.

Computer system 600 also includes a main memory 608, preferably random access memory (RAM), and may also include a secondary memory 610. The secondary memory 610 may include, for example, a hard disk drive 612 and/or a removable storage drive 614, representing a magnetic tape drive, an optical disk drive, etc. The removable storage drive 614 reads from and/or writes to a removable storage unit 618 in a well-known manner. Removable storage unit 618 represents a magnetic tape, optical disk, or other storage medium that is read by and written to by removable storage drive 614. As will be appreciated, the removable storage unit 618 can include a computer usable storage medium having stored therein computer software and/or data.

In alternative implementations, secondary memory 610 may include other means for allowing computer programs or other instructions to be loaded into computer system 600. Such means may include, for example, a removable storage unit 622 and an interface 620. An example of such means may include a removable memory chip (such as an EPROM, or PROM) and associated socket, or other removable storage units 622 and interfaces 620 which allow software and data to be transferred from the removable storage unit 622 to computer system 600.

Computer system 600 may also include one or more communications interfaces, such as communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, an RF link and other communications channels. In an embodiment of the invention, signals 628 comprise data packets sent to processor 604. Information representing processed packets can also be sent in the form of signals 628 from processor 604 through communications path 626.

The terms "computer program medium" and "computer usable medium" are used to generally refer to media such as removable storage units 618 and 622, a hard disk installed in hard disk drive 612, and signals 628, which provide software to the computer system 600.

Computer programs are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the present invention. Where the invention is implemented using software, the software may be stored in a computer program product and loaded into computer system 600 using removable storage drive 614, hard drive 612 or communications interface 624.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method of on-the-fly patching of executable code comprising:
   identifying original instructions to be changed while the original instructions are being executed on a processor;
   copying the original instructions to a storage location;
   adding a hook with a first jump instruction for transferring control to the copied instructions;
   using a second jump instruction in the copied instructions for transferring control to an unpatched instruction in a location where the instructions are being patched; and
   replacing the original instructions while the original instructions are in the process of being executed on the processor with mark instructions by using atomic writes that guarantee that a result of the operation can be observed as completed or not observed at all; and
   calling the hook,
   wherein the mark instructions place an identifiable set of data into a processor stack that is identified at a later time, such that the stack contains a number of how many instructions have been patched,
   wherein the hook activates the second jump instruction to transfer control to the copied instructions at a location just after the original instruction from which the hook was called;
   wherein the original instructions are part of the instruction set of the processor available to a user,
   wherein a number of times the mark instructions have been executed is counted to determine a location of the processor's instruction pointer where execution should resume, in the patched instructions, and
   wherein the modified instructions determine the number of the instructions at the location of the original code that had already been executed.

2. The method of claim 1, further comprising, prior to the copying step, allowing a write operation on a page in memory where the original code is located.

3. The method of claim 1, further comprising, prior to the copying step, masking interrupts.

4. The method of claim 1, further comprising, after the replacing step, disallowing a write operation on the page in memory where the block of code is located.

5. The method of claim 1, further comprising, after the replacing step, unmasking interrupts.

6. The method of claim 1, wherein the original instructions are changed in reverse order.

7. The method of claim 1, wherein the mark instructions are the same length, in bytes, as the instructions to be patched.

8. The method of claim 1, wherein the mark instructions are shorter in length, in bytes, as the instructions to be patched, and wherein NOP (no operation) filler follows the mark instructions.

9. The method of claim 1, wherein the modified instructions include a resolver that determines a number of instructions that had already been executed using the mark instructions.

10. The method of claim 9, wherein, if the number of instructions that had already been executed is less than a number of original instructions to be changed, the resolver calls the copied instructions at the storage location so as to imitate a "no patch installed" scenario.

11. The method of claim 10, wherein, after execution of the instructions at the storage location, the resolver returns control to the next instruction.

12. The method of claim 1, further comprising enabling functionality of the copied instructions at the storage location.

13. The method of claim 12, wherein the enabling step comprises reconciling addressing in the instructions in the storage location.

14. The method of claim 12, wherein the enabling step comprises alignment of instructions in the instructions at the storage location.

15. The method of claim 1, further comprising verifying that the original code is susceptible to patching.

16. The method of claim 15, wherein the verifying step determines whether any mark instructions are already present in the original instructions.

17. The method of claim 15, wherein the verifying step determines whether any copy protect instructions are already present in the original instructions.

18. The method of claim 15, wherein the verifying step determines whether the original instructions include a suitable jump point that can be modified to the transfer of control to the hook.

19. The method of claim 15, wherein the verifying step determines whether the original instructions represent valid instructions.

20. The method of claim 1, further comprising placing the hook in memory.

21. The method of claim 1, wherein the hook has been previously placed in memory.

22. The method of claim 1, wherein the atomic write replaces one instruction at a time.

23. The method of claim 1, wherein the atomic write replaces multiple instructions at a time.

24. The method of claim 1, wherein, for Intel IA-32 architecture, the atomic write uses any of "xchg", "lock cmpxchg8b," "lock cmpxchg," and "lock xchg" instructions.

25. A method of on-the-fly patching of executable code comprising:
    verifying that original instructions to be patched are susceptible to patching while the original instructions are being executed on a processor;
    generating pseudooriginal code by copying the original instructions to a different storage location from the original instructions;
    adding a hook with a first jump instruction to the pseudo-orignal code transferring control to the pseudoorinal instructions by using a second jump instruction in the copied instructions that always transfers control to unpatched instructions in a location where the instructions are being patched;
    replacing the original code while the original instructions are in the process of being executed on the processor with tag instructions that indicate only their execution by using atomic writes that guarantee that a result of the operation can be observed as completed or not observed at all; and
    calling the hook,
    wherein the original instructions are part of the instruction set of the processor available to a user,
    wherein the hook activates the second jump instruction to transfer control to the copied instructions at a location just after the original instruction from which the hook was called, wherein the tag instructions place an identifiable set of data into a processor stack that is identified at a later time, such that the stack contains a number of how many instructions have been patched, wherein a number of times the tag instructions have been executed is counted to determine a location of the processor's instruction pointer where execution should resume, in the patched instructions, and wherein the modified instructions determine the number of the instructions at the location of the original code that had already been executed.

26. The method of claim 25, wherein the original instructions are changed in reverse order.

27. The method of claim 25, wherein the tag instructions are the same length, in bytes, as the instructions to be patched.

28. The method of claim 25, wherein the tag instructions are shorter in length, in bytes, as the instructions to be patched, and wherein NOP (no operation) filler follows the mark instructions.

29. The method of claim 25, wherein, if the number of instructions that had already been executed is less than a number of original instructions to be patched, the pseudo-original code is called so as to imitate a "no patch installed" scenario.

30. The method of claim 29, wherein, after execution of the pseudooriginal code, control is returned to the next instruction.

31. The method of claim 25, further comprising reconciling addressing in the instructions in the storage location.

32. The method of claim 25, further comprising verifying that the original code is susceptible to patching.

33. The method of claim 32, wherein the verifying step determines whether any tag instructions are already present in the original instructions.

34. The method of claim 25, further comprising placing the hook in memory.

35. A method of on-the-fly patching of executable code comprising:

identifying original instructions to be patched while the original instructions are being executed on a processor;

allocating a storage location for storing a functionally equivalent copy of the original instructions;

copying the original instructions to the storage location;

adding a hook with a first jump instruction transferring control to the copied instructions by using a second jump instruction in the copied instructions that always transfers control to unpatched instructions in a location where the instructions are being patched;

replacing the original instructions while the original instructions are in the process of being executed on the processor with mark instructions by using atomic writes that guarantee that a result of the operation can be observed as completed or not observed at all; and calling he hook, wherein the copied instructions include a first jump instruction to the pseudooriginal code and the hook includes a second jump instruction that returns operations to patched instructions after the original instructions, wherein the hook activates the second jump instruction to transfer control to the pseudoorignal instructions at a location just after the original instruction from which the hook was called, wherein the mark instructions place an identifiable set of data into a processor stack that is identified at a later time, such that the stack contains a number of how many instructions have been patched, wherein the original instructions are part of the instruction set of the processor available to a user, wherein a number of times the mark instructions have been executed is counted to determine a location of the processor's instruction pointer where execution should resume, in the patched instructions, and wherein the modified instructions determine the number of the instructions at the location of the original code that had already been executed.

36. The method of claim 35, further comprising, prior to the allocating step, allowing a write operation on a page in memory where the original instructions are located.

37. The method of claim 35, wherein the original instructions are changed in reverse order.

38. The method of claim 35, wherein, if the number of instructions that had already been executed is less than a number of original instructions to be patched, the functionally equivalent copy is called so as to imitate a "no patch installed" scenario.

39. The method of claim 38, wherein, after execution of the functionally equivalent copy, control is returned to the next instruction.

40. The method of claim 35, further comprising verifying that the original instructions are susceptible to patching.

41. The method of claim 40, wherein the verifying step determines whether any mark instructions are already present in the original instructions.

42. The method of claim 40, wherein the verifying step determines whether any copy protect instructions are already present in the original instructions.

43. The method of claim 35, further comprising enabling functionality of the copied instructions at the storage location.

44. A computer useable removable storage unit having computer program logic stored thereon for executing on a processor, for on-the-fly patching of executable code, the computer program logic comprising:

computer program code means for identifying original instructions to be patched while the original instructions are being executed on a processor;

computer program code means for copying the original instructions to a storage location;

computer program code means for adding a hook with a first jump instruction transferring control to the copied instructions by using a second jump instruction in the copied instructions that always transfers control to unpatched instructions in a location where the instructions are being patched;

computer program code means for replacing the original instructions while the original instructions are in the process of being executed on the processor with mark instructions by using atomic writes that guarantee that a result of the operation can be observed as completed or not observed at all; and calling the hook, wherein the original instructions are part of the instruction set of the processor available to a user, wherein the hook activates the second jump instruction to transfer control to the copied instructions at a location just after the original instruction from which the hook was called, wherein the mark instructions place an identifiable set of data into a processor stack that is identified at a later time, such that the stack contains a number of how many instructions have been patched, wherein a number of times the mark instructions have been executed is counted to determine a location of the processor's instruction pointer where execution should resume, in the patched instructions, and wherein the modified instructions determine the number of the instructions at the location of the original code that had already been executed.

45. The computer program logic of claim 44, wherein the original instructions are changed in reverse order.

46. The computer program logic of claim 44, wherein the mark instructions are the same length, in bytes, as the instructions to be patched.

47. The computer program logic of claim 44, wherein the mark instructions are shorter in length, in bytes, as the instructions to be patched, and wherein NOP (no operation) filler follows the mark instructions.

48. The computer program logic of claim 44, wherein, if the number of instructions that had already been executed is less than a number of original instructions to be patched, the copied instructions at the storage location are called so as to imitate a "no patch installed" scenario.

49. The computer program logic of claim 48, wherein, after execution of the instructions to the storage location, control is returned to the next instruction.

50. The computer program logic of claim 44, further comprising computer program code means for enabling functionality of the copied instructions at the storage location.

51. The computer program logic of claim 50, wherein the computer program code means for enabling functionality of the copied instructions at the storage location comprises computer program code means for reconciling addressing in the instructions in the storage location.

52. The computer program logic of claim 44, further comprising computer program code means for verifying that the original code is susceptible to patching.

53. The computer program logic of claim 52, wherein the computer program code means for verifying determines whether any mark instructions are already present in the original instructions.

54. A computer useable removable storage unit having computer program logic stored thereon for executing on a processor, for on-the-fly patching of executable code, the computer program logic comprising:

computer program code means for verifying that original instructions to be patched are susceptible to patching while the original instructions are being executed on a processor;

computer program code means for generating pseudooriginal code from the original instructions at a different storage location from the original instructions;

computer program code means for adding a hook to the pseudooriginal code with a first jump instruction transferring control to the pseudoorignal instructions by using a second jump instruction in the pseudooriginal instructions that always transfers control to unpatched instructions in a location where the instructions are being patched;

computer program code means for replacing the original code while the original code is in the process of being executed on the processor with tag instructions that indicate only their execution by using atomic writes that guarantee that a result of the operation can be observed as completed or not observed at all; and calling the hook, wherein the original instructions are part of the instruction set of the processor available to a user, wherein the hook activates the second jump instruction to transfer control to the pseudoorignal instructions at a location just after the original instruction from which the hook was called, wherein the tar instructions place an identifiable set of data into a processor stack that is identified at a later time, such that the stack contains a number of how many instructions have been patched, wherein a number of times the tag instructions have been executed is counted to determine a location of the processor's instruction pointer where execution should resume, in the patched instructions, and wherein the modified instructions determine the number of the instructions at the location of the original code that had already been executed.

55. A computer useable removable storage unit having computer program logic stored thereon for executing on a processor, for on-the-fly patching of executable code, the computer program logic comprising:

computer program code means for identifying original instructions to be patched while the original instructions are executed on a processor;

computer program code means for allocating a storage location for storing a functionally equivalent copy of the original instructions;

computer program code means for copying the original instructions to the storage location;

computer program code means for adding a hook with a first jump instruction transferring control to the copied instructions by using a second jump instruction in the copied instructions that always transfers control to unpatched instructions in a location where the instructions are being patched;

computer program code means for replacing the original instructions while the original instructions are in the process of being executed on the processor with mark instructions by using atomic writes that guarantee that a result of the operation can be observed as completed or not observed at all; and computer program code means for calling the hook, wherein the original instructions are part of the instruction set of the processor available to a user, wherein the hook activates the second jump instruction to transfer control to the copied instructions at a location just after the original instruction from which the hook was called, wherein the mark instructions place an identifiable set of data into a processor stack that is identified at a later time, such that the stack contains a number of how many instructions have been patched, wherein a number of times the mark instructions have been executed is counted to determine a location of the processor's instruction pointer where execution should resume, in the patched instructions, and wherein the modified instructions determine the number of the instructions at the location of the original code that had already been executed.

56. A system for on-the-fly patching of executable code comprising:

a processor;

a memory operatively coupled to the processor;

computer code loaded into the memory for implementing the functionality of:

means for identifying original instructions to be patched while the instructions are being executed on the processor;

means for copying the original instructions to a storage location;

means for adding a hook with a first jump instruction transferring control to the copied instructions by using a second jump instruction in the copied instructions that always transfers control to unpatched instructions in a location where the instructions are being patched;

means for replacing the original code as while the code is in the process of being executed on the processor with mark instructions by using atomic writes that guarantee that a result of the operation can be observed as completed or not observed at all; and calling the hook, wherein the original instructions are part of the instruction set of the processor available to a user, wherein the hook activates the second jump instruction to transfer control to the copied instructions at a location just after the original instruction from which the hook was called, wherein the mark instructions place an identifiable set of data into a processor stack that is identified at a later time, such that the stack contains a number of how many instructions have been patched, wherein a number of times the mark instructions have been executed is counted to determine a location of the processor's instruction pointer where execution should resume, in the patched instructions, and wherein the modified instructions determine the number of the instructions at the location of the original code that had already been executed.

57. A system for on-the-fly patching of executable code comprising:

a processor;

a memory operatively coupled to the processor;

computer code loaded into the memory for implementing the functionality of:

means for verifying that original instructions to be patched are susceptible to patching while the instructions are being executed on the processor;

means for generating pseudooriginal code from the original instructions at a different storage location from the original instructions;

means for adding a hook with a first jump instruction to the pseudooriginal instructions transferring control to the pseudoorignal instructions by using a second jump instruction in the pseudoorignal instructions that always transfers control to unpatched instructions in a location where the instructions are being patched;

means for replacing the original code while the original code is in the process of being executed on the processor with tag instructions that indicate only their execution by using atomic writes that guarantee that a result of the operation can be observed as completed or not observed at all; and calling the hook, wherein the original instructions are part of the instruction set of the processor available to a user, wherein the tag instructions place an identifiable set of data into a processor stack that is identified at a later time, such that the stack contains a number of how many instructions have been patched;

wherein the hook activates the second jump instruction to transfer control to the copied instructions at a location just after the original instruction from which the hook was called, wherein a number of times the tag instructions have been executed is counted to determine a location of the processor's instruction pointer where execution should resume, in the patched instructions; and wherein the modified instructions determine the number of the instructions at the location of the original code that had already been executed.

58. A system for on-the-fly patching of executable code comprising:

a processor;

a memory operatively coupled to the processor;

computer code loaded into the memory for implementing the functionality of:

means for identifying original instructions to be changed while the instructions are executed on the processor;

means for allocating a storage location for storing a functionally equivalent copy of the original instructions;

means for copying the original instructions to the storage location;

means for adding a hook with a first jump instruction transferring control to the copied instructions by using a second jump instruction in the copied instructions that always transfers control to unpatched instructions in a location where the instructions are being patched;

means for replacing the original instructions while the original instructions are in the process of being executed on the processor with mark instructions by using atomic writes that guarantee that a result of the operation can be observed as completed or not observed at all; and calling the hook;

wherein the mark instructions place an identifiable set of data into a processor stack that is identified at a later time, such that the stack contains a number of how many instructions have been patched, wherein the hook activates the second jump instruction to transfer control to the copied instructions at a location just after the original instruction from which the hook was called, wherein the original instructions are part of the instruction set of the processor available to a user, wherein a number of times the mark instructions have been executed is counted to determine a location of the processor's instruction pointer where execution should resume, in the patched instructions, and wherein the modified instructions determine the number of the instructions at the location of the original code that had already been executed.

59. The method of claim 1, wherein the process of execution of the original instructions is not interrupted throughout the patching process.

60. The method of claim 25, wherein the process of execution of the original code is not interrupted throughout the patching process.

* * * * *